(12) United States Patent
Gruhlke (10) Patent No.: US 7,031,572 B2
(45) Date of Patent: Apr. 18, 2006

(54) OPTICAL COUPLER

(76) Inventor: Russell W. Gruhlke, 800 Cambridge Dr., Fort Collins, CO (US) 80525

( * ) Notice: Subject to any disclaimer, the term of this patent is extended or adjusted under 35 U.S.C. 154(b) by 26 days.

(21) Appl. No.: 10/804,398

(22) Filed: Mar. 19, 2004

(65) Prior Publication Data
US 2005/0207700 A1    Sep. 22, 2005

(51) Int. Cl.
*G02B 6/34* (2006.01)
*G02B 6/26* (2006.01)
*G02B 6/42* (2006.01)

(52) U.S. Cl. ............... 385/37; 385/27; 385/31
(58) Field of Classification Search ............ 385/10
See application file for complete search history.

(56) References Cited

U.S. PATENT DOCUMENTS

| 3,774,987 | A | * | 11/1973 | Boivin | 385/37 |
| 4,466,696 | A | * | 8/1984 | Carney | 385/49 |
| 5,082,629 | A | * | 1/1992 | Burgess et al. | 422/82.11 |
| 5,191,624 | A | * | 3/1993 | Ito et al. | 385/7 |
| 5,218,584 | A | * | 6/1993 | Gfeller | 369/44.12 |
| 5,351,262 | A | * | 9/1994 | Poguntke et al. | 372/102 |
| 5,481,516 | A | * | 1/1996 | Kim | 369/44.12 |
| 5,978,139 | A | * | 11/1999 | Hatakoshi et al. | 359/565 |
| 6,525,307 | B1 | * | 2/2003 | Evans et al. | 250/227.16 |
| 6,536,957 | B1 |   | 3/2003 | Buchter |  |

* cited by examiner

*Primary Examiner*—Frank G. Font
*Assistant Examiner*—Charlie Peng (57) ABSTRACT

An optical coupler including a substrate, a diffractive optical element defined in the substrate, the diffractive optical element structured to receive incident light diverging from a first location and to focus the incident light at a second location opposite the first location, an electro-optical device mounted on the substrate to one of (a) emit light from and (b) receive light at one of the locations, and an optical waveguide mounted on the substrate to one of (a) receive light at and (b) emit light from the other of the locations.

19 Claims, 8 Drawing Sheets

OPTICAL COUPLER

TECHNICAL FIELD

The technical field of this disclosure is optical couplers, particularly, an optical coupler with reduced alignment sensitivity.

BACKGROUND OF THE INVENTION

Alignment of optical sources, such as a laser or a light emitting diode, to optical waveguides requires accurate alignment of the optical source with the waveguide. The sizes of the active region of an optical source and the core of the waveguide to be aligned are often very small, on the order of micrometers (□m). A coupling element, such as a lens, is typically used to focus the diverging optical rays of an optical source into the core of the waveguide.

Active alignment is required to achieve reasonable coupling efficiency between the optical source and the waveguide. During active alignment, components are moved relative to each other to find the optimal position. The optical source emits light and an intermediate lens focuses the emitted light onto the core of a waveguide. Light coupled into the core of the waveguide is emitted from the opposite end of the waveguide, where it is measured by a photodetector. As the optical source, the lens and the waveguide are moved laterally, axially, and angularly with respect to each other, the light transmitted through the waveguide is monitored for peak output intensity. Active alignment of three components is time consuming and labor intensive, increases manufacturing time and cost, and increases product prices.

Permanently securing the components in their relative positions after alignment also causes problems. For a solid state laser aligned with a single mode optical fiber, the movement of the aligned components must be less than about 500 nm. Adhesives, such as epoxy, shrink during curing, so that the aligned components are moved as the epoxy cures. Component offsets of one micrometer or more commonly occur. One approach to overcome this problem is to continue active alignment as the epoxy cures. This requires a series of labor intensive partial-curing and aligning steps, further increasing manufacturing complexity, time and expense.

Clamps can be used to mechanically secure the components, but stress from the clamps shifts the relative position of the components. Component offsets of one micrometer or more commonly occur. Although the components can be mounted with an offset to allow for the movement from clamping, the additional uncertainty results in many unsuccessful alignments.

It would be desirable to have an optical coupler that that would overcome the above disadvantages.

SUMMARY OF THE INVENTION

The present invention is an optical coupler operable to couple an optical source to an optical waveguide. A diffractive optical element is positioned with respect to the optical source to diffract the light between the optical source and the optical waveguide to simplify alignment of the optical source and the optical waveguide. The improved coupling according to the present invention reduces alignment errors, and the time and labor required for alignment.

One aspect of the present invention provides an optical coupler including a substrate, a diffractive optical element defined in the substrate and structured to receive incident light diverging from a first location and to focus the incident light at a second location opposite the first location. The optical coupler further includes an electro-optical device mounted on the substrate to one of (a) emit light from and (b) receive light at one of the locations. The optical coupler further includes an optical waveguide mounted on the substrate to one of (a) receive light at and (b) emit light from the other of the locations.

A second aspect of the present invention provides an optical coupling method, including providing a diffractive optical element, obliquely illuminating the diffractive optical element with incident light, focusing the incident light with the diffractive optical element; and receiving the focused, diffracted light.

A third aspect of the present invention provides a method of manufacturing an optical coupling, including providing a substrate comprising a semiconductor layer, forming in the semiconductor layer an electro-optical device having a front facet, etching the substrate to form a recessed surface adjacent the front facet; and defining a diffractive optical element in the recessed surface.

The above and other features and advantages of the invention will become further apparent from the following detailed description of the presently preferred embodiments, read in conjunction with the accompanying drawings. The detailed description and drawings are merely illustrative of the invention, rather than limiting the scope of the invention being defined by the appended claims and equivalents thereof.

DETAILED DESCRIPTION OF PRESENTLY PREFERRED EMBODIMENTS

The invention is based on the observation that a diffractive optical element can provide optical coupling that is relatively insensitive to alignment of the optical source and the optical waveguide. The diffractive optical element is used to focus incident light onto an optical waveguide. Any light incident on the diffractive optical element, regardless of the angle of incidence, is diffracted onto the optical waveguide. Throughout the description herein, light refers to electromagnetic radiation from the ultra-violet region of the spectrum through the infrared region of the spectrum.

Figure 1:
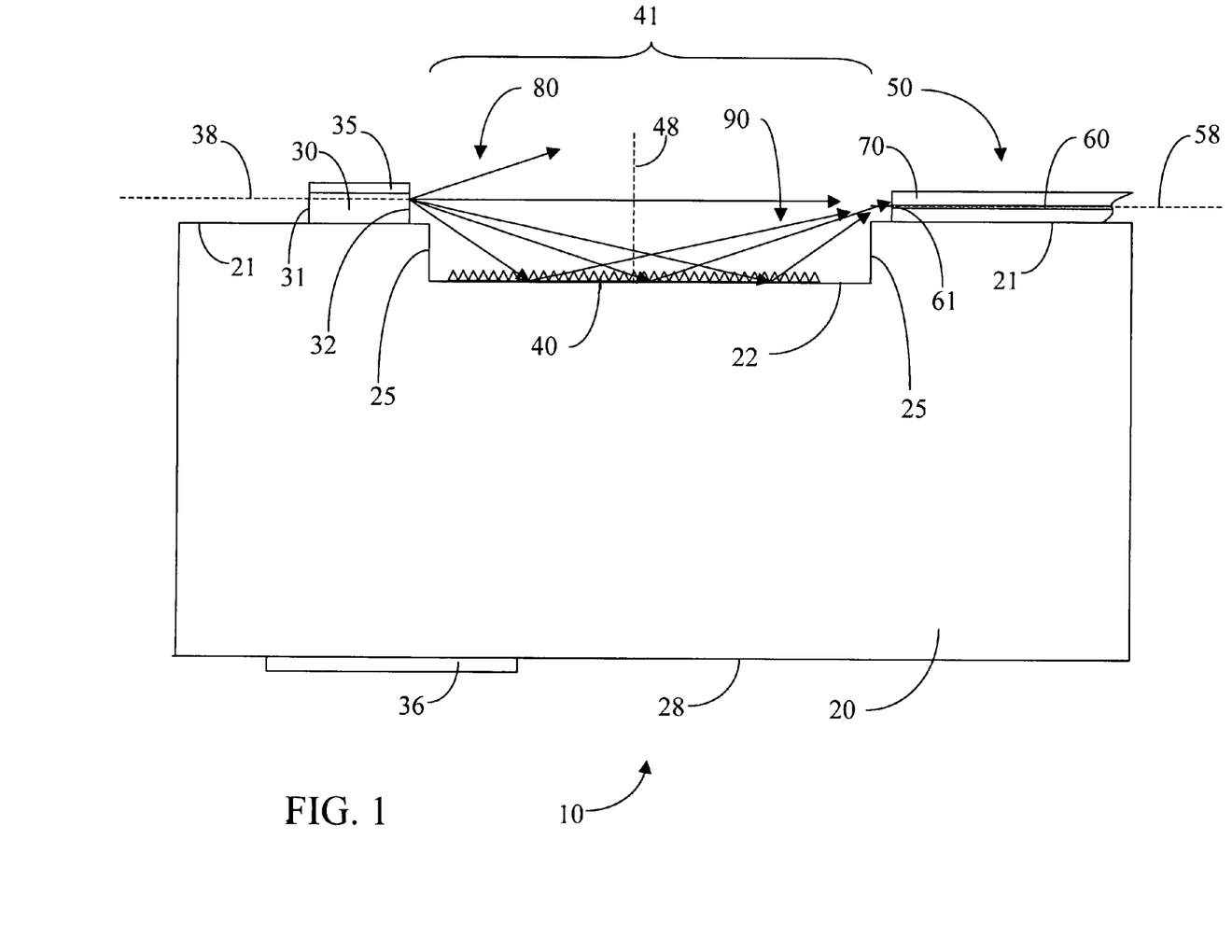
FIGS. 1 & 2 are a side view and top view, respectively, of a schematic diagram of an optical coupler according to a first embodiment of the invention.
Figure 2:
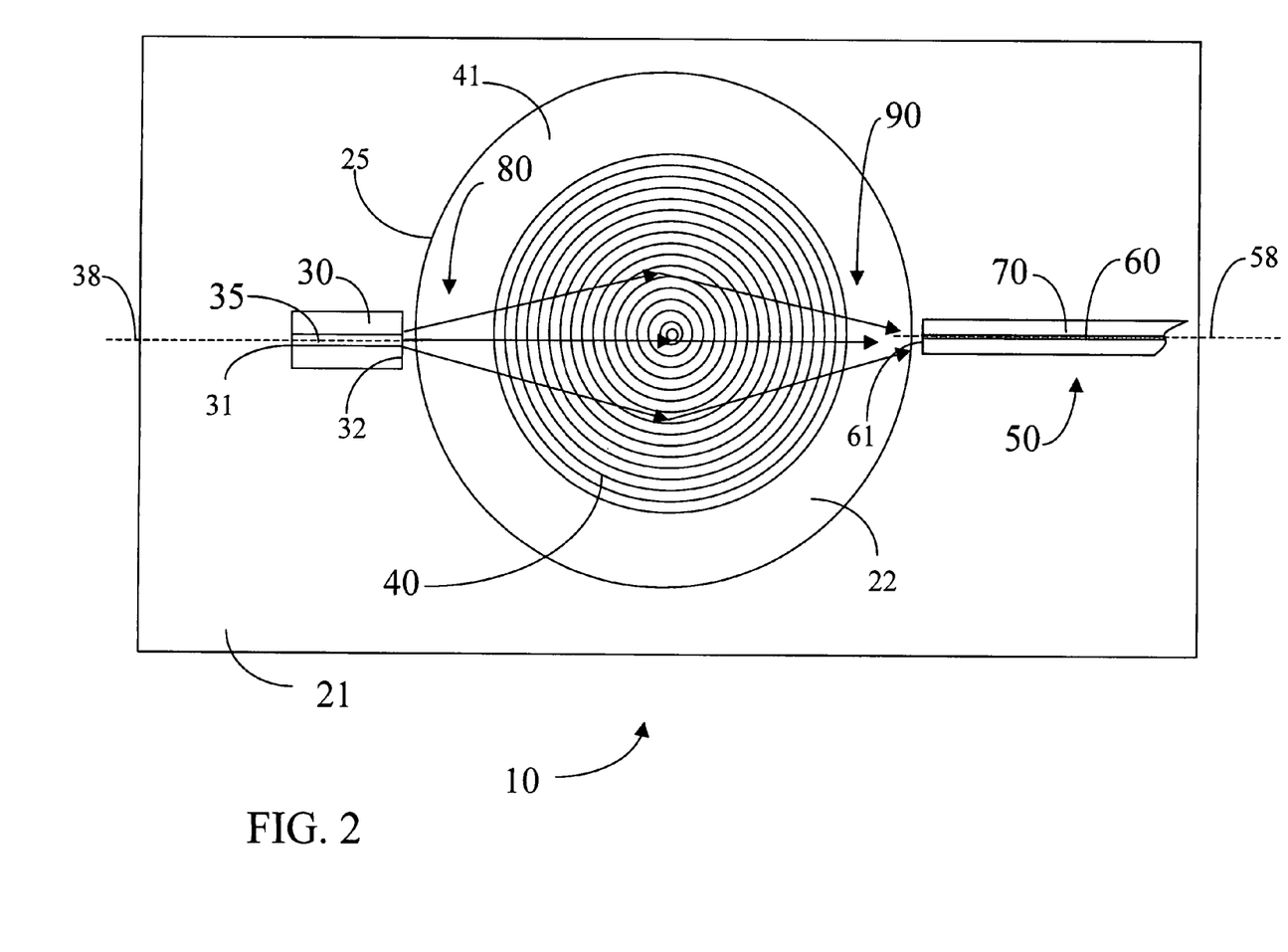

FIGS. 1 & 2 show a cross-sectional side view and top view, respectively, of a schematic diagram of an optical coupler 10 according to a first embodiment of the invention. One use for the optical coupler is to align an electro-optical device with an optical fiber in a telecommunications system.

A substrate 20 has a major surface 21. A well 41 is defined in the substrate 20 to form a recessed or bottom surface 22 adjacent the front facet 32. The well 41 extends into the substrate from major surface 21 and has a bottom surface 22, which is parallel to major surface 21 in this example. The well 41 has a sidewall 25. A diffractive optical element 40 is defined in the bottom surface 22 of the well 41. The diffractive optical element 40 defines a plane, which is parallel to the bottom surface 22. In an alternative embodiment, the plane defined by the diffractive optical element 40 is tilted with respect to the bottom surface 22. The diffractive optical element 40 is structured to receive incident light diverging from a first location and to focus the incident light at a second location opposite the first location.

An electro-optical device 30 and an optical waveguide 50 are aligned across the center of the diffractive optical element 40. The electro-optical device 30 is located at the first location with front facet 32 near the intersection of the major surface 21 and the sidewall 25. The optical waveguide 50 is located at the second location with endface 61 near the intersection of the major surface 21 and the portion of sidewall 25 diametrically opposite the front facet 32. The second location is opposite the first location. Optical coupling of a measurable amount of light between the electro-optical device 30 and the optical waveguide 50 satisfies the definition of opposite, herein. Thus, the term "opposite" encompasses a range of opposing positions, and the first location and second location need not be exactly opposite each other. The range of opposing positions between the electro-optical device 30 and the optical waveguide 50 in which optical coupling occurs is greater for a multimode optical waveguide 50 than for a single-mode optical waveguide 50. Maximum optical coupling is typically achieved when the sidewall 25 is exactly opposite the front facet 32.

The optical axis 38 of the electro-optical device 30 and the waveguide optical axis 58 of the waveguide 50 are co-linear and parallel the plane defined by the diffractive optical element 40. The optical axis 48 of the diffractive optical element 40 is normal the plane defined by the diffractive optical element 40. The optical axis 48 intersects the device optical axis 38 and waveguide optical axis 58. The axes 38, 48 and 58 generally collectively define a single plane, although the diffractive optical element 40 allows for imperfect alignment.

The diffractive optical element 40 directs incident light from a source to a focal point opposite the source across the diffractive optical element 40. As shown in FIG. 1, the light is emitted from the electro-optical device 30, and focused at the optical waveguide 50. In this case, the electro-optical device is a laser or a light emitting diode. In an alternative embodiment, the light is emitted from the core 60 of the optical waveguide 50 and focused on the electro-optical device 30. In that case, the electro-optical device 30 is a photodetector.

Diffractive optical elements are holographic devices that work by breaking up incoming waves of light into a large number of waves, which recombine to form completely new waves. Diffractive optical elements operate by diffraction rather than refraction or reflection. In one embodiment, the diffractive optical element 40 is composed of a series of concentric blazed gratings having a radial symmetry about axis 48. In an alternative embodiment, the diffractive optical element 40 is a vortex diffractive optical element. In another alternative embodiment, the diffractive optical element 40 is composed of a series of concentric blazed gratings having asymmetry about axis 48 to correct for astigmatism of the optical source. In this case, the blazed gratings are elliptical rather than circular.

The optical waveguide 50 is any device capable of receiving and transmitting light, such as an optical fiber. The optical waveguide 50 has a core 60 and a cladding 70 surrounding the core 60. Light is received or emitted from the endface 61 of the core 60.

The electro-optical device 30 has a front facet 32 and a rear facet 31. A first electrode 35 is parallel to the device optical axis 38 and overlies a portion of the electro-optical device 30. A second electrode 36, shown in FIG. 1, is located under the electro-optical device 30 on bottom surface 28 of substrate 20.

In FIG. 1, the electro-optical device 30 is a laser or light emitting diode, which emits incident light 80 when current is injected into the electro-optical device 30 through the electrodes 35 and 36. A portion of the incident light 80 is incident on the diffractive optical element 40. The diffractive optical element 40 diffracts the incident light 80 of a given wavelength at a first order of diffraction. The diffracted light 90 converges at a focal point on or near the endface 61 of the core 60 and is coupled into the optical waveguide 50. The front facet 32 and endface 61 are positioned near diametrically-opposed regions of the sidewall 25 to maximize the coupling of light between the electro-optical device 30 and the optical waveguide 50.

In an alternative embodiment, light transmitted within an optical waveguide 50 is emitted from the waveguide endface 61 of the optical waveguide 50 and focused by the diffractive optical element 40 onto the electro-optical device 30. In this case, the electro-optical device 30 is a photodetector, which will generate a current between the electrodes 35 and 36.

The optical coupler 10 is formed by photolithographically processing the substrate 20. The well 41 is chemically etched through the major surface 21 of the substrate 20 and the diffractive optical element 40 is chemically etched in the bottom surface 22 of the well 41. The chemical etching of the well 41 additionally forms the sidewall 25.

The electro-optical device 30 is a laser, light emitting diode, other light source or photodetector formed from semiconductor layers (not shown) grown on the major surface 21 of the substrate 20. The semiconductor layers are grown prior to photolithographic processing by molecular beam epitaxy (MBE), metal organic chemical vapor deposition (MOCVD) or other growth methods. The electro-optical device 30 is formed by etching through one or more of the layers of semiconductor material (not shown) on the major surface 21 of the substrate 20. The etching forms a rear facet 31 and a front facet 32 perpendicular to the major surface 21 and opposite each other. When the electro-optical device 30 is a laser, the front facets 32 and rear facets 31 are mirrored.

The major surface 21 of the substrate 20 holds optical waveguide 50 so that waveguide optical axis 58 is parallel within a few milliradians of and co-linear within a few micrometers to device optical axis 38 of the electro-optical device 30. In an alternative embodiment, a channel or v-groove is chemically etched into the major surface 21 through the sidewall 25. The optical waveguide 50, such as an optical fiber, is positioned in the channel. The photolithographic techniques used to fabricate the diffractive optical element 40, the electro-optical device 30 and the channel to hold the optical waveguide 50 provide precise and accurate alignment.

Figure 3:
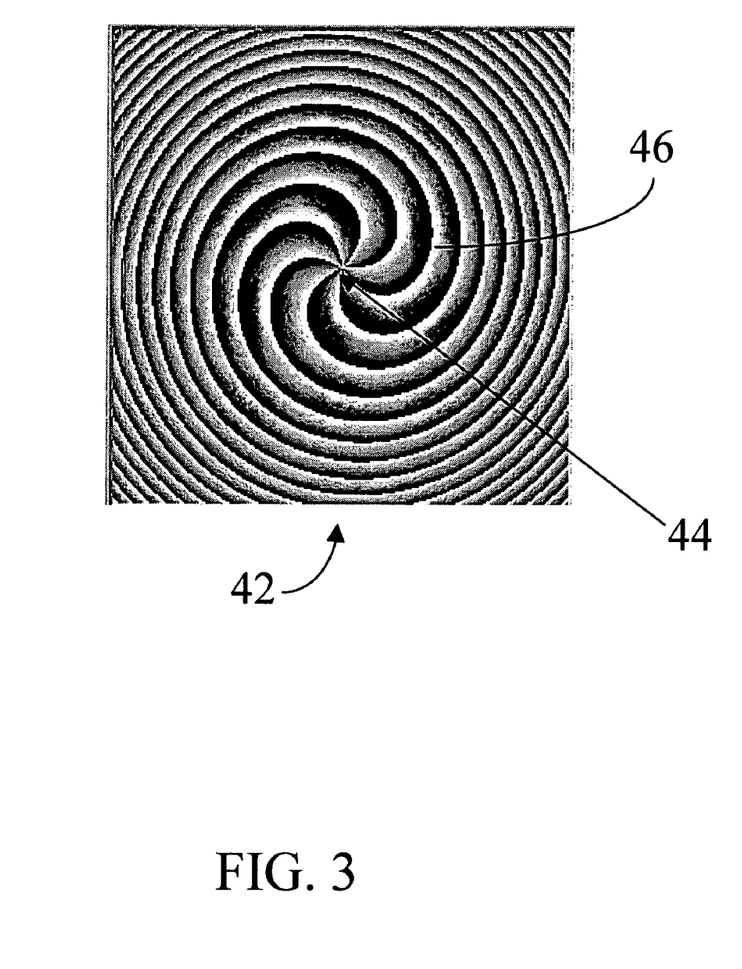
FIG. 3 is a top view of an alternative diffractive element.

FIG. 3 is a top view of an alternative embodiment of a diffractive optical element available for use in optical coupler 10. In this example, the diffractive optical element 42 is a vortex diffractive optical element with seven swirls 46 that converge at a central point 44. The vortex diffractive optical element 42 is etched into the bottom surface 22 of well 41. The diffractive optical element 42 defines a plane, which is parallel to the bottom surface 22. In an alternative embodiment, the plane defined by the diffractive optical element 42 is tilted with respect to the bottom surface 22. The diffractive optical element 42 is structured to receive emitted light and to focus incident light. Light is diffracted around the optical axis 48 (FIG. 1) normal to the vortex diffraction pattern. The vortex diffraction pattern reduces the amount of light backscattered toward the optical source compared to the concentric pattern discussed in conjunction with FIG. 1. The optical axis 48 of the diffractive optical element 42 is normal to plane defined by the diffractive optical element 42.

Figure 4:
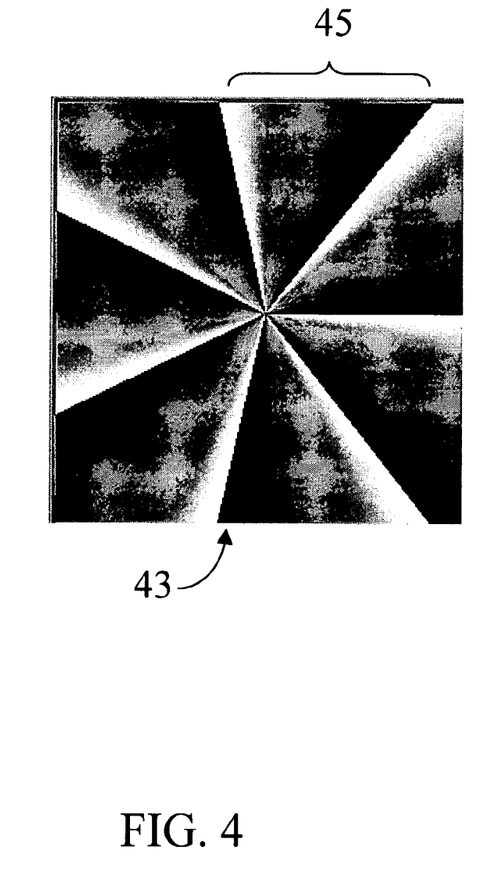
FIG. 4 is a top view of a radial diffractive element.

The vortex diffractive optical element 42 is created by superposing two diffractive patterns. The first pattern is the concentric grating pattern of the diffractive optical element 40 as shown in FIG. 2. The second pattern is the radial grating pattern 43 shown in FIG. 4. The grating depth in the radial grating pattern 43 varies azimuthally. The relative grayness of FIG. 4 illustrates the relative grating depth. The radial grating pattern is repeated in each of the seven radial segments 45. Superposition of the concentric grating pattern shown in FIG. 2 and the radial grating pattern shown in FIG. 4 creates the vortex pattern of the vortex diffractive optical element 42 shown in FIG. 3. In an alternative embodiment, more than seven radial segments are used to produce more swirls 46 in the vortex diffractive optical element 42. The number of swirls 46 in the vortex diffractive optical element 42 is equal to the number of radial segments 45 in the radial pattern of the diffractive element 43.

Figure 5:
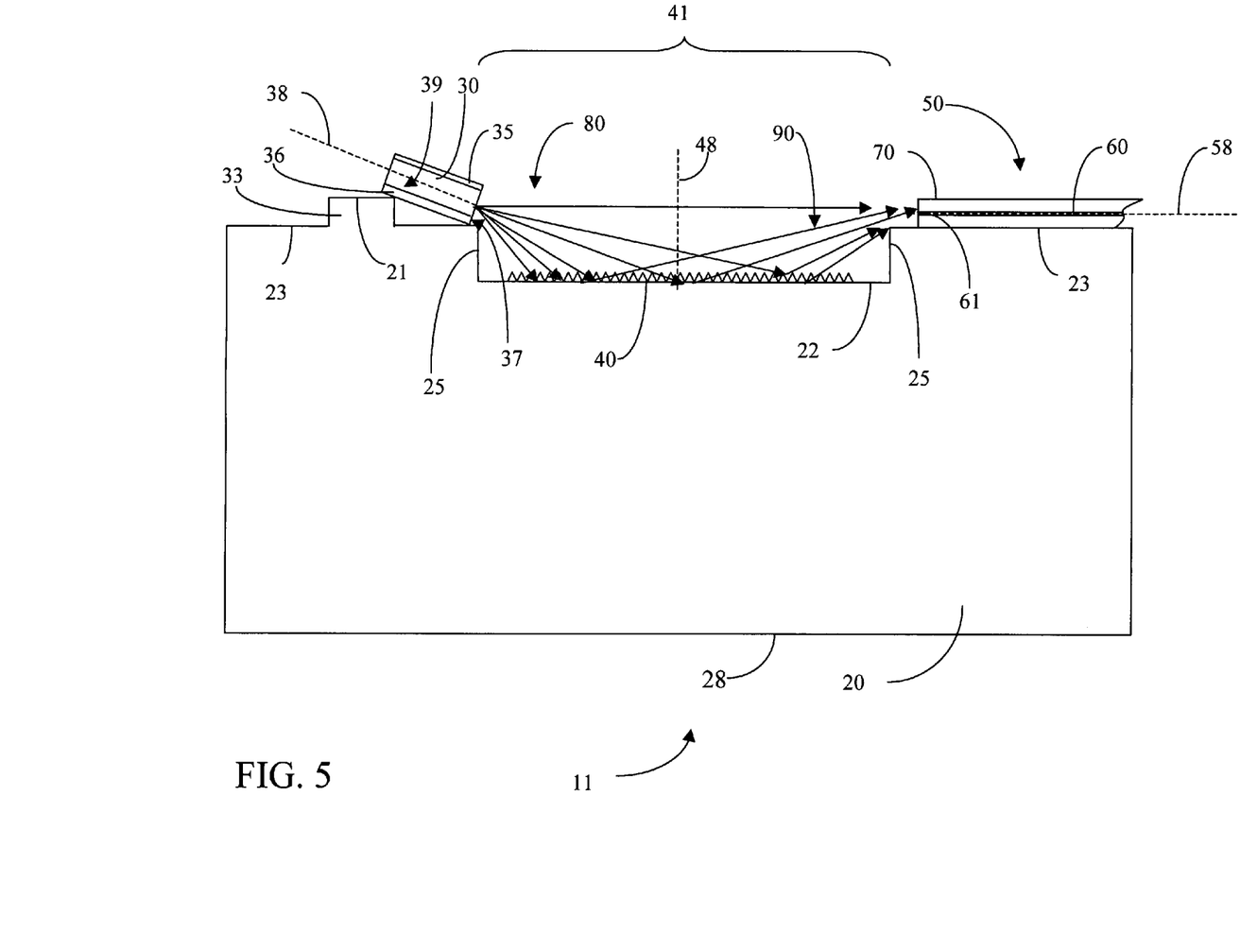
FIG. 5 is a side view of a schematic diagram of an optical coupler according to a second embodiment of the invention.

FIG. 5, in which like elements share like reference numbers with FIG. 1, shows a cross-sectional side view of a schematic diagram of an optical coupler 11 according to an alternative embodiment of the invention. In this embodiment, the electro-optical device 30 is mounted with the device optical axis 38 tilted with respect to the plane defined by the diffractive optical element 40.

Substrate 20 is contoured to form an intermediate surface 23 intermediate between the major surface 21 and the bottom surface 22 and to define alignment pedestal 33. In this example, the intermediate surface 23 is parallel to the major surface 21. The major surface 21 forms the top of alignment pedestal 33 after the substrate 20 has been etched down to form the intermediate surface 23. The photolithographic techniques used to fabricate the diffractive optical element 40 and the alignment pedestal 33 provide precise and accurate alignment of the diffractive optical element 40 and the alignment pedestal 33.

The alignment pedestal 33 is located on intermediate surface 23 near well 40. The alignment pedestal 33 tilts the electro-optical device 30 to increase the fraction of the incident light 80 incident on the diffractive optical element 40 compared to the embodiment illustrated in FIG. 1. When a larger fraction of incident light 80 is incident on diffractive optical element 40, a larger fraction of the diffracted light 90 is coupled to the core 60 of the waveguide 50.

The electro-optical device 30 is supported between the major surface 21 atop pedestal 33 and the intermediate surface 23 adjacent to sidewall 25. The bottom corner 37 of the electro-optical device 30 is supported by the intermediate surface 23 and the back end 39 of the electro-optical device 30 is supported by the pedestal 33. The second electrode 36 is disposed on the bottom of the electro-optical device 30. The optical waveguide 50 is supported by the intermediate surface 23. The device optical axis 38 of the electro-optical device 30 forms a non-orthogonal angle with the optical reflective axis 48 of the diffractive optical element 40.

A number of alternatives to the example of FIG. 5 are possible. In one alternative embodiment, the pedestal 33 includes a number of separate or connected pedestals to further constrain the position of the electro-optical device 30 on the pedestal 33 and the intermediate surface 23. In another alternative embodiment, the optical waveguide 50 is supported at the elevation of the major surface 21, rather than the elevation of the intermediate surface 23. In another alternative embodiment, a channel or v-groove is chemically etched into the major surface 21 through the sidewall 25. The optical waveguide 50, such as an optical fiber, is positioned in the channel. The photolithographic techniques used to fabricate the diffractive optical element 40, the alignment pedestal 33 and the channel to hold the optical waveguide 50 provide precise and accurate alignment.

In FIG. 5, the electro-optical device 30 is a laser or a light emitting diode. In an alternative embodiment, light transmitted within an optical waveguide 50 is emitted from the waveguide endface 61 of the optical waveguide 50 and focused by the diffractive optical element 40 onto the electro-optical device 30. In this case, the electro-optical device 30 is a photodetector, which will generate a current between the electrodes 35 and 36.

Figure 6:
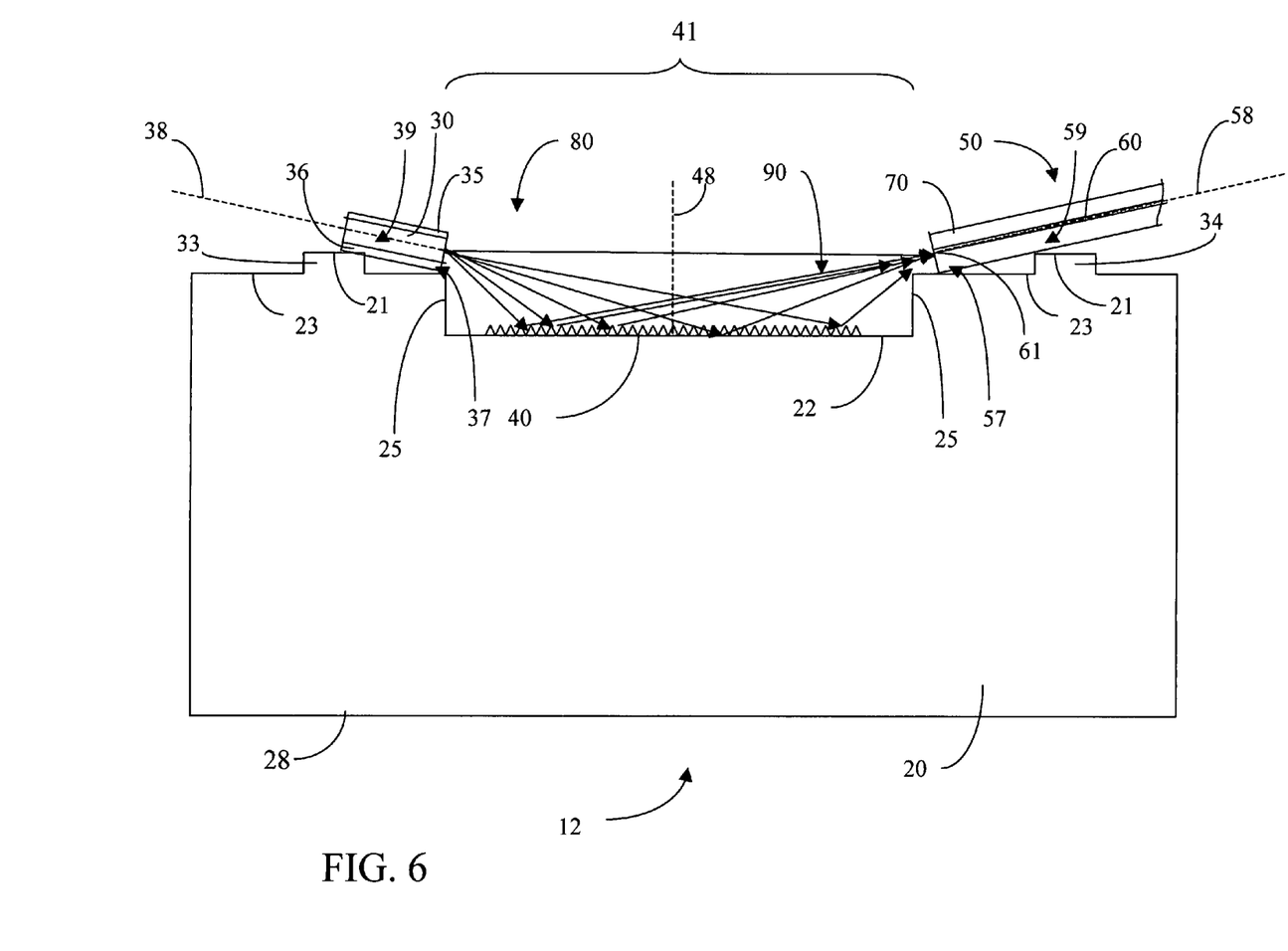
FIG. 6 is a side view of a schematic diagram of an optical coupler according to a third embodiment of the invention.

FIG. 6, in which like elements share like reference numbers with FIG. 5, shows a cross-sectional side view of a schematic diagram of an optical coupler 12 according to an alternative embodiment of the invention. In this embodiment, the optical waveguide 50 is also mounted with the waveguide optical axis 38 tilted with respect to the plane defined by the diffractive optical element 40.

Substrate 20 is contoured to form an intermediate surface 23, which defines pedestals 33 and 34. In this example, the intermediate surface 23 is parallel to the major surface 21 and is intermediate between the major surface 21 and the bottom surface 22. The major surface 21 forms the top of the alignment pedestal 33 and alignment pedestal 34 after the substrate 20 has been etched down to form the intermediate surface 23. The photolithographic techniques used to fabricate the diffractive optical element 40 and the alignment pedestals 33 and 34 provide precise and accurate alignment of the diffractive optical element 40 and the alignment pedestals 33 and 34.

The alignment pedestal 34 tilts the optical waveguide 50 to increase the fraction of the diffracted light 90 within the acceptance angle of the core 60 of optical waveguide 50. When a larger fraction of diffracted light 90 within the acceptance angle is received at the optical waveguide 50, a larger fraction of the diffracted light 90 is coupled to the core 60 of the optical waveguide 50 compared to the embodiment illustrated in FIGS. 1 & 5.

The optical waveguide 50 is supported between the major surface 21 and the intermediate surface 23. The front edge 57 of the optical waveguide 50 is supported by the intermediate surface 23 and the waveguide section 59 of the optical waveguide 50 is supported by the pedestal 34. The waveguide optical axis 58 of the optical waveguide 50 forms a non-orthogonal angle with the optical reflective axis 48 of the diffractive optical element 40.

A number of alternatives to the example of FIG. 6 are possible. In one alternative embodiment, the pedestal 34 includes a number of separate or connected pedestals to further constrain the position of the optical waveguide 50 on the pedestal 34 and the intermediate surface 23. In another alternative embodiment, a channel, stepped channel or v-groove is chemically etched into the major surface 21 and intermediate surface 23 through the sidewall 25. The optical waveguide 50, such as an optical fiber, is positioned in the channel. The photolithographic techniques used to fabricate the diffractive optical element 40, the alignment pedestal 34 and the channel to hold the optical waveguide 50 provide precise and accurate alignment.

In the embodiment illustrated in FIG. 6 the electro-optical device 30 is a laser or a light emitting diode. In an alternative embodiment, light transmitted within an optical waveguide 50 is emitted from the waveguide endface 61 of the optical waveguide 50 and focused by the diffractive optical element 40 onto the electro-optical device 30. In this case, the electro-optical device 30 is a photodetector, which will generate a current between the electrodes 35 and 36.

Figure 7:
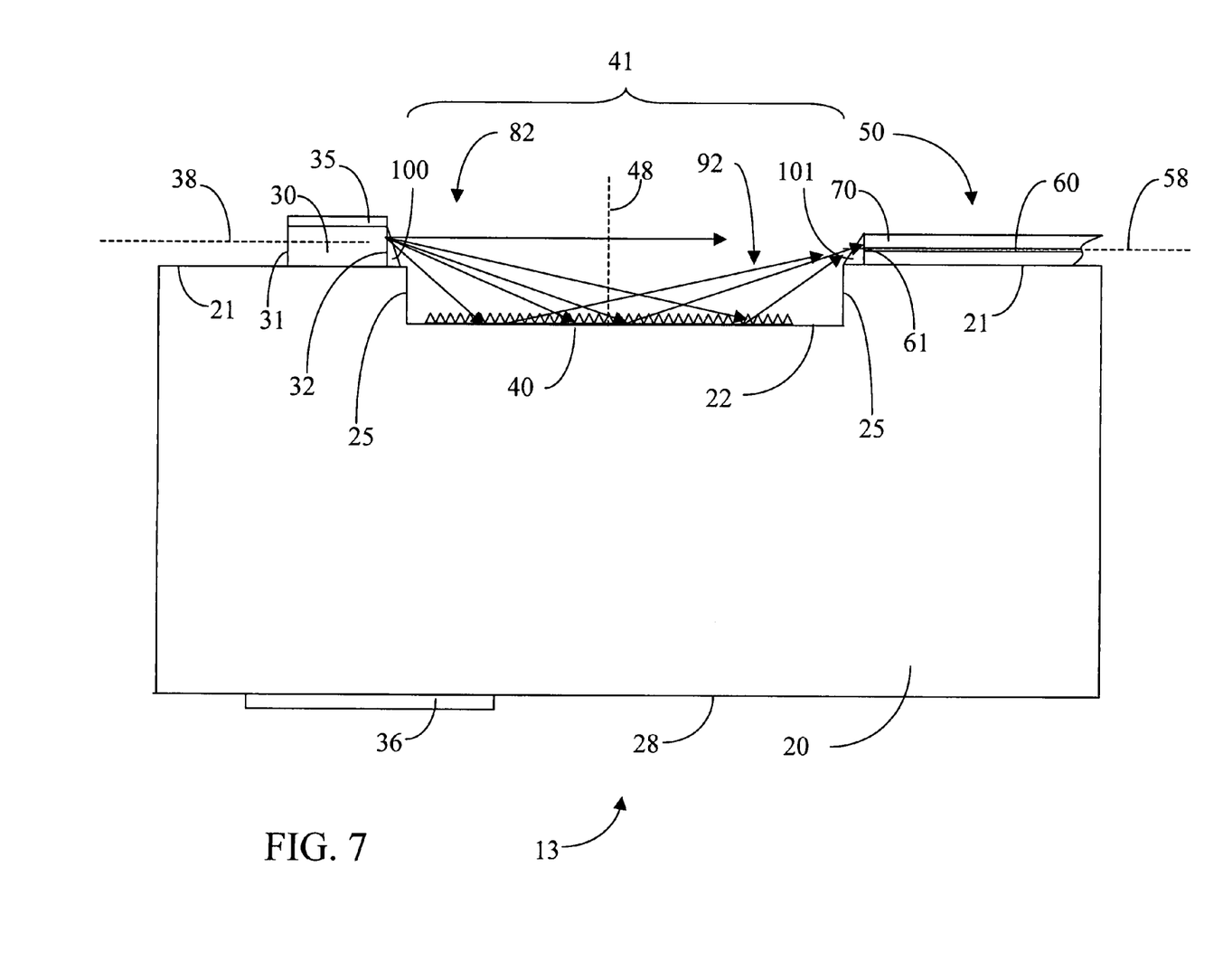
FIG. 7 is a side view of a schematic diagram of an optical coupler according to a fourth embodiment of the invention.

FIG. 7, in which like elements share like reference numbers with FIG. 1, shows a cross-sectional side view of schematic diagram of an optical coupler 13 according to an alternative embodiment of the invention. The optical coupler 13 includes micro-prisms 100 and 101 disposed between the electro-optical device 30 and the optical waveguide 50, respectively, and diffractive optical element 40. The micro-prisms 100 and 101 increase the coupling of light through the optical coupler. The micro-prism 100 at the electro-optical device 30 and the micro-prism 101 at the optical waveguide 50 are supported by major surface 21.

The micro-prism 100 is located at the front facet 32 of the electro-optical device 30. The micro-prism 100 refracts the light generated by the laser or light emitting diode towards diffractive optical element 40 as the light leaves the electro-optical device 30 as incident light 82. The incident light 82 is incident on the diffractive optical element 40. The refraction of the light by the micro-prism 100 towards diffractive optical element 40 causes a larger fraction of the incident light 82 to fall on the diffractive optical element 40 than occurs in the example of FIG. 1.

The micro-prism 101 is located at or adjacent the endface 61 of the core 60 of optical waveguide 50. The micro-prism 101 refracts the diffracted light 92 from the diffractive optical element 40 into the optical waveguide 50. The refraction by the micro-prism 101 causes a larger fraction of the diffracted light 92 to enter the core 60 of the optical waveguide 50 than in the example of FIG. 1.

In an alternative embodiment, one of the micro-prisms 100 or 101 is omitted from the optical coupler 13. In another alternative embodiment, the endface 61 of optical waveguide 50 is beveled to provide the optical equivalent of the micro-prism 101. In other alternative embodiments, micro-diffractive elements are used instead of or in addition to one or more of the micro-prisms 100 and 101.

In FIG. 7 the electro-optical device 30 is a laser or a light emitting diode. In an alternative embodiment, light transmitted within an optical waveguide 50 is emitted from the waveguide endface 61 of the optical waveguide 50, refracted by microlens 101, focused by the diffractive optical element 40, refracted by microlens 100 to be focused onto the electro-optical device 30. In this case, the electro-optical device 30 is a photodetector, which will generate a current between the electrodes 35 and 36.

Figure 8:
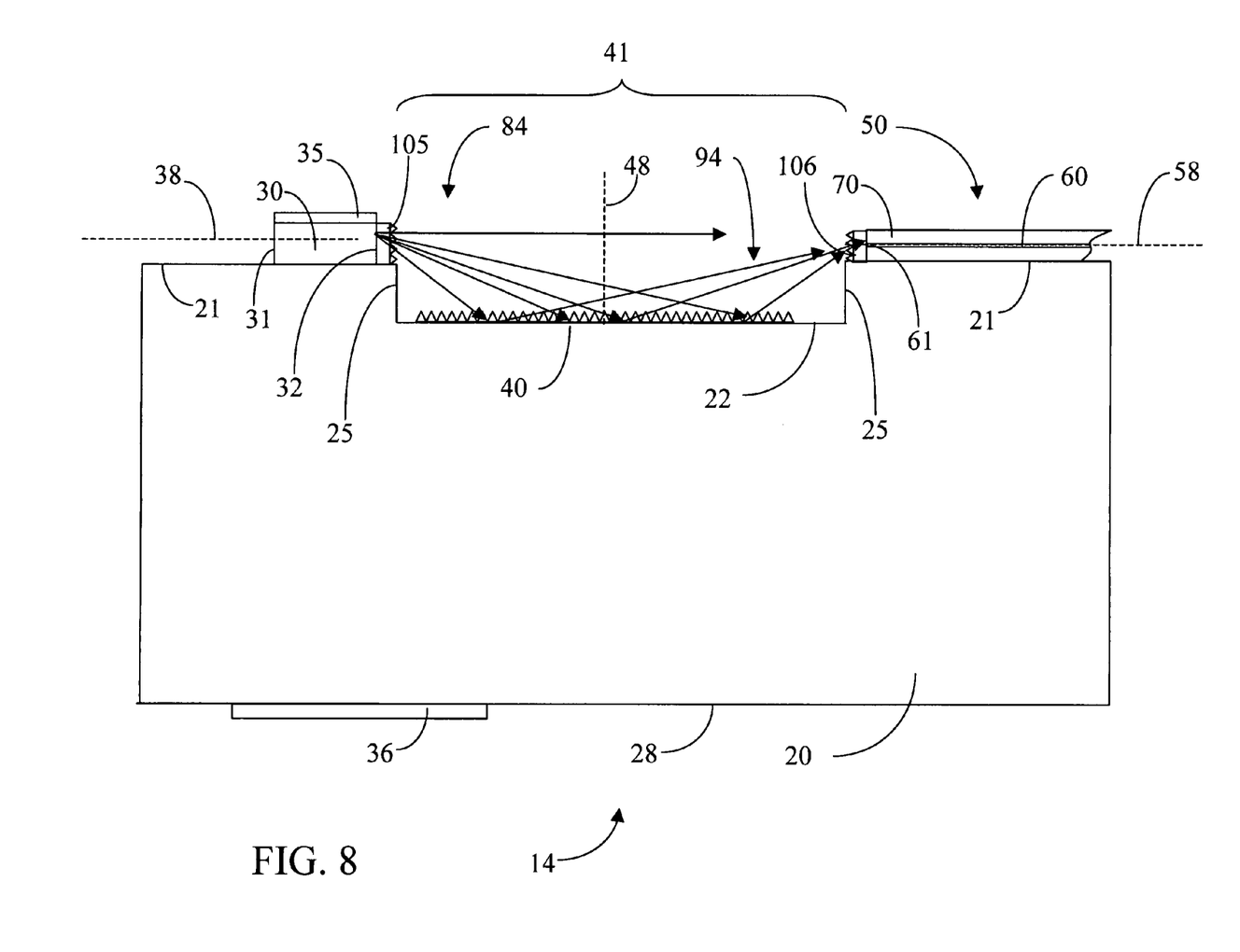
FIG. 8 is a side view of a schematic diagram of an optical coupler according to a fifth embodiment of the invention.

FIG. 8, in which like elements share like reference numbers with FIG. 1, shows a cross-sectional side view of schematic diagram of an optical coupler 14 according to an alternative embodiment of the invention. The optical coupler 14 includes micro-diffractive elements 105 and 106 located at or adjacent the electro-optical device 30 and the optical waveguide 50, respectively, to increase the coupling of light across the optical coupler. In the example shown, the micro-diffractive element 105 at the electro-optical device 30 and micro-diffractive element 106 at the optical waveguide 50 are supported by major surface 21.

The micro-diffractive element 105 is located at or adjacent the front facet 32 of the electro-optical device 30. The micro-diffractive element 105 diffracts the light generated by the laser or light emitting diode towards diffractive optical element 40 as the light leaves the electro-optical device 30 as incident light 84. The incident light 84 is incident on the diffractive optical element 40. The diffraction of the incident light 84 by the micro-diffractive element 105 towards diffractive optical element 40 causes a larger fraction of the incident light 84 to fall on the diffractive optical element 40 than in the example of FIG. 1.

The micro-diffractive element 106 is located at or adjacent the endface 61 of the core 60. The micro-diffractive element 106 diffracts the diffracted light 94 from the diffractive optical element 40 into the optical waveguide 50. The diffraction by the micro-diffractive element 106 causes a larger fraction of the diffracted light 94 to enter the core 60 of the optical waveguide 50 than in the example of FIG. 1.

In FIG. 8 the electro-optical device 30 is a laser or a light emitting diode. In an alternative embodiment, light transmitted within an optical waveguide 50 is emitted from the waveguide endface 61 of the optical waveguide 50, diffracted by microlens 106, focused by the diffractive optical element 40, diffracted by microlens 105 to be focused onto the electro-optical device 30. In this case, the electro-optical device 30 is a photodetector, which will generate a current between the electrodes 35 and 36.

While the embodiments of the invention disclosed herein are presently considered to be preferred, various changes and modifications can be made without departing from the scope of the invention. The scope of the invention is indicated in the appended claims, and all changes that come within the meaning and range of equivalents are intended to be embraced therein.

I claim:

1. An optical coupler, comprising:
   a substrate;
   a diffractive optical element defined in the substrate, the diffractive optical element structured to receive incident light diverging from a first location and to focus the incident light at a second location opposite the first location across the diffractive optical element;
   an electro-optical device mounted on the substrate to one of (a) emit light from and (b) receive light at one of the first and the second locations; and
   an optical waveguide mounted on the substrate to one of (a) receive light at and (b) emit light from the other of the first and the second locations.

2. The optical coupler of claim 1, in which the electro-optical device comprises one of a laser, a light emitting diode and a photodetector.

3. The optical coupler of claim 1, in which:
   the diffractive optical element defines a plane; and
   the electro-optical device has a device optical axis and is mounted with the device optical axis tilted with respect to the plane.

4. The optical coupler of claim 3, additionally comprising a pedestal defined in the substrate and supporting at least a portion of the electro-optical device.

5. The optical coupler of claim 1, in which:
   the diffractive optical element defines a plane; and the optical waveguide has a waveguide optical axis and is mounted with the waveguide optical axis tilted with respect to the plane.

6. The optical coupler of claim 5, additionally comprising a pedestal defined in the substrate and supporting at least a portion of the optical waveguide.

7. The optical coupler of claim 1, in which the substrate defines a channel aligned with the diffractive optical element and structured to receive the optical waveguide.

8. The optical coupler of claim 1, in which:
the diffractive optical element defines a plane;
the electro-optical device has a device optical axis and is mounted with the device optical axis parallel to the plane; and
the optical waveguide has a waveguide optical axis and is mounted with the waveguide optical axis parallel to the device optical axis.

9. The optical coupler of claim 1, in which the diffractive optical element comprises one of a concentric blazed grating and a vortex diffractive optical element.

10. The optical coupler of claim 1, in which the diffractive optical element comprises a concentric grating pattern superposed with a radial grating pattern.

11. The optical coupler of claim 1, additionally comprising one of a micro-prism and a micro-diffractive element located between the electro-optical device and the diffractive optical element.

12. The optical coupler of claim 1, additionally comprising one of a micro-prism and a micro-diffractive element located between the optical waveguide and the diffractive optical element.

13. The optical coupler of claim 1, in which:
the first location and the second location define a line parallel to and offset from a plane defined by the diffractive optical element.

14. An optical coupling method, comprising:
providing a diffractive optical element;
obliquely illuminating the diffractive optical element with incident light;
focusing the incident light with the diffractive optical element; and
receiving the focused, diffracted light across the diffractive optical element.

15. A method of manufacturing an optical coupling, comprising:
providing a substrate comprising a semiconductor layer;
forming in the semiconductor layer and electro-optical device having a front facet;
etching the substrate to form a recessed surface adjacent the front facet;
defining a diffractive optical element in the recessed surface; and
positioning an optical waveguide on the substrate across the diffractive optical element from the front facet.

16. The method of claim 15, additionally comprising:
etching a channel in the substrate across the diffractive optical element from the front facet; and
positioning the optical waveguide in the channel.

17. The method of claim 15, additionally comprising etching the substrate to define a pedestal.

18. The method of claim 17, in which:
the pedestal is across the diffractive optical element from the front facet; and
the method additionally comprises supporting the optical waveguide with the pedestal, the optical waveguide tilted toward the diffractive optical element.

19. The method of claim 15, additionally comprising mounting an optical element adjacent the front facet, the optical element comprising one of a micro-prism and a micro-diffractive element.

* * * * *